United States Patent
Kim et al.

(10) Patent No.: US 9,411,537 B2
(45) Date of Patent: Aug. 9, 2016

(54) EMBEDDED MULTIMEDIA CARD (EMMC), EMMC SYSTEM INCLUDING THE EMMC, AND METHOD OF OPERATING THE EMMC

(71) Applicant: SAMSUNG ELECTRONICS CO., LTD., Suwon-Si, Gyeonggi-Do (KR)

(72) Inventors: Hyun Ju Kim, Hwaseong-Si (KR); Young Jin Park, Suwon-Si (KR); Jin Young Lee, Hwaseong-Si (KR); Won Chul Ju, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/026,322

(22) Filed: Sep. 13, 2013

(65) Prior Publication Data

US 2014/0082224 A1   Mar. 20, 2014

(30) Foreign Application Priority Data

Sep. 14, 2012   (KR) .......................... 10-2012-0102480

(51) Int. Cl.
| | |
|---|---|
| *G06F 3/00* | (2006.01) |
| *G06F 5/00* | (2006.01) |
| *G06F 13/24* | (2006.01) |
| *G06F 3/06* | (2006.01) |
| *G06F 13/28* | (2006.01) |

(52) U.S. Cl.
CPC .............. *G06F 3/0659* (2013.01); *G06F 3/061* (2013.01); *G06F 3/0607* (2013.01); *G06F 3/0679* (2013.01); *G06F 3/0634* (2013.01); *G06F 13/28* (2013.01)

(58) Field of Classification Search
CPC ....... G06F 3/0634; G06F 11/12; G06F 11/14; G06F 13/28
USPC ....................................... 710/5, 7, 14, 58, 261
See application file for complete search history.

(56) References Cited

U.S. PATENT DOCUMENTS

| | | | | |
|---|---|---|---|---|
| 6,678,825 | B1 * | 1/2004 | Ellison | .................... G06F 21/74 710/200 |
| 7,032,039 | B2 | 4/2006 | DeCaro | |
| 7,130,958 | B2 | 10/2006 | Chou et al. | |
| 7,743,202 | B2 | 6/2010 | Tsai et al. | |
| 7,900,012 | B2 | 3/2011 | Chang et al. | |
| 2001/0037438 | A1 * | 11/2001 | Mathis | ..................... G06F 21/51 711/163 |
| 2006/0132822 | A1 * | 6/2006 | Walmsley | ........... G06F 12/1408 358/1.14 |
| 2008/0256322 | A1 * | 10/2008 | Chang et al. | .................. 711/173 |
| 2009/0210637 | A1 * | 8/2009 | Yung | ..................... G06F 13/385 711/154 |
| 2010/0274953 | A1 * | 10/2010 | Lee et al. | ........................ 711/103 |
| 2011/0099313 | A1 * | 4/2011 | Bolanowski | ................... 710/262 |
| 2011/0191525 | A1 * | 8/2011 | Hsu | ........................ G06F 12/00 711/103 |

(Continued)

FOREIGN PATENT DOCUMENTS

| | | |
|---|---|---|
| JP | 2006120082 | 5/2006 |
| KR | 0425692 | 3/2004 |

*Primary Examiner* — Idriss N Alrobaye
*Assistant Examiner* — Getente A Yimer
(74) *Attorney, Agent, or Firm* — Volentine & Whitt, PLLC

(57) ABSTRACT

An embedded multimedia card (eMMC), and a method of operating an eMMC, determine whether a vendor mode is to be entered by parsing a command argument of a command received from a host or a pattern of write data received from the host; receive vendor mode attribute information for the vendor mode, based on a result of determining whether the vendor mode is to be entered; and performing a vendor mode operation in the vendor mode based on the vendor mode attribute information.

13 Claims, 19 Drawing Sheets

(56) References Cited

U.S. PATENT DOCUMENTS

2012/0036287 A1 2/2012 Lee
2012/0110214 A1* 5/2012 Hahn .................... G06F 3/0607
                                                      710/11

* cited by examiner

FIG. 4

| Row Address | Write Data | | | | | | | |
|---|---|---|---|---|---|---|---|---|
| 00000000 | FF | FF | FF | FF | FF | FF | FF | FF |
| 00000010 | FF | FF | FF | FF | 06 | 00 | BE | 05 |
| 00000020 | C5 | 02 | 90 | 03 | 65 | 03 | 67 | 03 |
| 00000030 | 8C | 84 | BA | 81 | 95 | 81 | 9B | 83 |
| 00000040 | 89 | 81 | D7 | 82 | C0 | 81 | 76 | 84 |
| 00000050 | 3A | 03 | 8A | 03 | 65 | 03 | 67 | 03 |

EMBEDDED MULTIMEDIA CARD (EMMC), EMMC SYSTEM INCLUDING THE EMMC, AND METHOD OF OPERATING THE EMMC

CROSS-REFERENCE TO RELATED APPLICATIONS

This application claims the benefit of Korean Patent Application No. 10-2012-0102480, filed on Sep. 14, 2012, in the Korean Intellectual Property Office, the disclosure of which is incorporated herein in its entirety by reference.

BACKGROUND

Embodiments of the inventive concept relate to an embedded multimedia card (eMMC), and more particularly, to an eMMC having a high compatibility with a host in a vendor mode, an eMMC system including the eMMC, and a method of operating the eMMC.

MultiMediaCard (MMC) is a memory card standard for flash memory.

eMMC is a standard for embedded MMCs that was established by the Joint Electronic Devices Engineering Council (JEDEC). eMMC communication is based on a 10-signal bus. An eMMC compliant device may be inserted into and used in a mobile telecommunication device such as a smart phone.

SUMMARY

According to an aspect of the inventive concept, there is provided a method of operating an embedded multimedia card (eMMC), the method including: determining whether a vendor mode is to be entered by parsing a command argument of a command received from a host; receiving vendor mode attribute information for the vendor mode, based on a result of determining whether the vendor mode is to be entered; and performing a vendor mode operation in the vendor mode based on the vendor mode attribute information.

In an embodiment, determining of whether the vendor mode is to be entered may include determining whether the command argument is a valid value by checking whether the command argument is outside a range of a valid addresses of a memory cell array of the eMMC according to the size of the memory cell array, and, when it is determined that the command argument is an invalid value, determining whether a part of the command argument corresponding to a specific address is equal to a value indicating entering the vendor mode.

In an embodiment, the command may be a read command or a write command.

In an embodiment, the command may be a first write command, and the vendor mode attribute information may be included in one of the first write command, a second write command received after the first write command, and a first read command.

In an embodiment, the command may be a first write command, and the vendor mode attribute information may be included in first write data received after the first write command.

In an embodiment, the command may be a first read command, and the vendor mode attribute information may be included in one of the first read command, a second read command received after the first read command, and a first write command In an embodiment, the command may be a first read command, and the vendor mode attribute information may be included in first write data received after the first read command.

In an embodiment, the vendor mode attribute information may include type information regarding the vendor mode.

According to another aspect of the inventive concept, there is provided a method of operating an eMMC, the method including determining whether a vendor mode is to be entered by parsing a pattern of write data received from a host; receiving vendor mode attribute information for the vendor mode, based on a result of determining whether the vendor mode is to be entered; and performing a vendor mode operation in the vendor mode based on the vendor mode attribute information.

In an embodiment, the write data may be first write data, and the vendor mode attribute information may be included in a first write command or a first read command received after the first write data.

In an embodiment, the write data may be first write data, and the vendor mode attribute information may be included in one of the first write data and second write data received after the first write data.

In an embodiment, the vendor mode attribute information may include type information regarding the vendor mode.

According to another aspect of the inventive concept, there is provided an eMMC including a memory including a memory cell array in which a plurality of memory cells are arranged; and a memory controller for controlling exchange of data between a host and the memory. The memory controller includes a data parsing unit for generating vendor mode entering information indicating whether a vendor mode is to be entered by parsing one of: (1) a command argument of a command received from the host, and (2) a pattern of write data received from the host; and a control logic for changing a mode of the memory controller based on the vendor mode entering information.

In an embodiment, the memory controller may further include a volatile memory for storing the vendor mode entering information and vendor mode attribute information needed to perform the vendor mode.

In an embodiment, the data parsing unit may be embodied as hardware.

In an embodiment, the vendor mode attribute information may be included in the command or data received from the host.

According to another aspect of the inventive concept, there is provided an eMMC system including the eMMC, and a host for exchanging data with the eMMC and transmitting the vendor mode entering information via at least one of the command and the write data.

BRIEF DESCRIPTION OF THE DRAWINGS

Exemplary embodiments of the inventive concept will be more clearly understood from the following detailed description taken in conjunction with the accompanying drawings.

FIG. 4 is a diagram illustrating an example of a portion of write data input to an eMMC device.

DETAILED DESCRIPTION OF THE EMBODIMENTS

Figure 1:
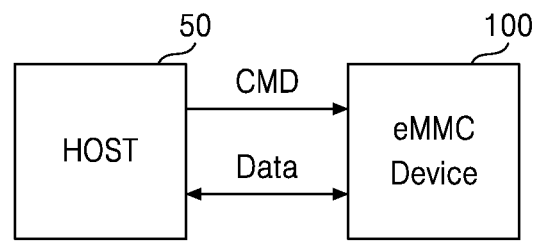
FIG. 1 is a block diagram of an embedded multimedia card (eMMC) system according to an embodiment of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The embedded multimedia card (eMMC) electrical standard (version 4.51), i.e., JESD84-B451, published by the Joint Electron Devices Engineering Council (JEDEC) (http://www.jedec.org) in June 2012 is hereby incorporated by reference. Accordingly, unless otherwise defined, terms and definitions used herein have the same meaning as defined in the JESD84-B451.

Herein, a channel transmitting a signal or a voltage may be a host pad, an eMMC pad, a bus, a line, a driver (including a differential amplifier in some embodiments), a receiver (including a differential amplifier in some embodiments), or a combination of at least two thereof.

Unless explicitly otherwise described with a specific intention, the propagation delay of a functional circuit such as a bus, a wire, a pad (or a pin), a driver, a receiver, and/or a differential amplifier is not considered for the sake of convenience in the description.

For the sake of convenience in the description, unless explicitly otherwise described with a specific intention, the input signal and the output signal of a particular functional circuit may be denoted by the same name.

FIG. 1 is a block diagram of an embodiment of an embedded multimedia card (eMMC) system 10.

Referring to FIG. 1, eMMC system 10 includes a host 50 and a device 100, e.g., an eMMC device 100.

Host 50 may control a data processing operation of eMMC device 100, e.g., a data read operation, a data write operation, or the like. The data processing operation may be performed at a single data rate (SDR) or a double data rate (DDR). In particular, when the data processing operation is performed at the DDR, host 50 or eMMC device 100 may operate in a DDR 400 mode. The DDR 400 mode means an operating mode in which data can be processed at a 200 MHz DDR when an input/output operating voltage of host 50 or eMMC device 100 is 1.2 V or 1.8 V.

Host 50 may be understood as a data processing device capable of processing data, e.g., a central processing unit (CPU), a processor, a microprocessor, or an application processor. The data processing device may be embedded in or embodied as an electronic device.

The electronic device may be embodied as a personal computer (PC), a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book player.

eMMC device 100 may be electrically connected to host 50 via any of various connection devices, e.g., pads, pins, a bus, or communication lines, so as to establish data communication with host 50. Host 50 may transmit a command CMD, a clock signal, etc., to eMMC device 100 via any of the various connection devices. Host 50 may exchange data with eMMC device 100 via any of the various connection devices.

Host 50 may generate a command CMD for controlling an operation of eMMC device 100. For example, the command CMD may be a read command for controlling a data read operation, a write command for controlling a data write operation, an erase command for controlling a data erase operation, a write protect command for defining a particular region of a memory cell array (not shown) included in eMMC device 100 as a write protection region, or a lock/unlock command for setting eMMC device 100 in a locked/unlocked state, or the like.

eMMC 100 may be defined as being in a particular mode from a time period from when eMMC device 100 receives the command CMD from host 50 to when eMMC device 100 completes an operation according to the command CMD. For example, during a time period from when eMMC device 100 receives a read command from host 50 to when eMMC device 100 completes transmission of data requested in the read command eMMC may be defined as being in a read mode.

According to an embodiment of the inventive concept, eMMC may be in at least two modes simultaneously. For example, eMMC device 100 may receive a write command for a write mode operation while read data RD is transmitted from eMMC device 100 to host 50 after the read command is received for a read mode operation.

Host 50 may change a mode of eMMC device 100 by transmitting a different command CMD to eMMC device 100. For example, after host 50 transmits the write command to eMMC device 100 and eMMC device 100 thus enters the write mode, transmission of write data may be completed and eMMC device 100 may then enter the read mode according to the read command from host 50.

Also, eMMC device 100 may have a vendor mode in which unique functions of eMMC device 100 are used. For example, vendor modes may be include a patch update mode for changing a patch file stored in the memory cell array of eMMC device 100, a debugging mode for debugging data or program code stored in the memory cell array, a dump data mode for dumping some of the data stored in the memory cell array, and the like. These vendor modes may include an operation of writing patch update data to the memory cell array, or an operation of reading debugged data, or dumping data from the memory cell array.

eMMC device 100 may enter a particular vendor mode according to an additional vendor command, or may enter a particular vendor mode according to a general command other than the vendor command (e.g., a write command, a read command, etc.), or according to vendor mode entering information included in write data. The vendor mode entering information will be described in detail with reference to FIGS. 2 to 4 below.

In some embodiments of an eMMC system, a host is capable of controlling a vendor mode of an eMMC device based on a command or write data other than an additional vendor command.

Figure 2:
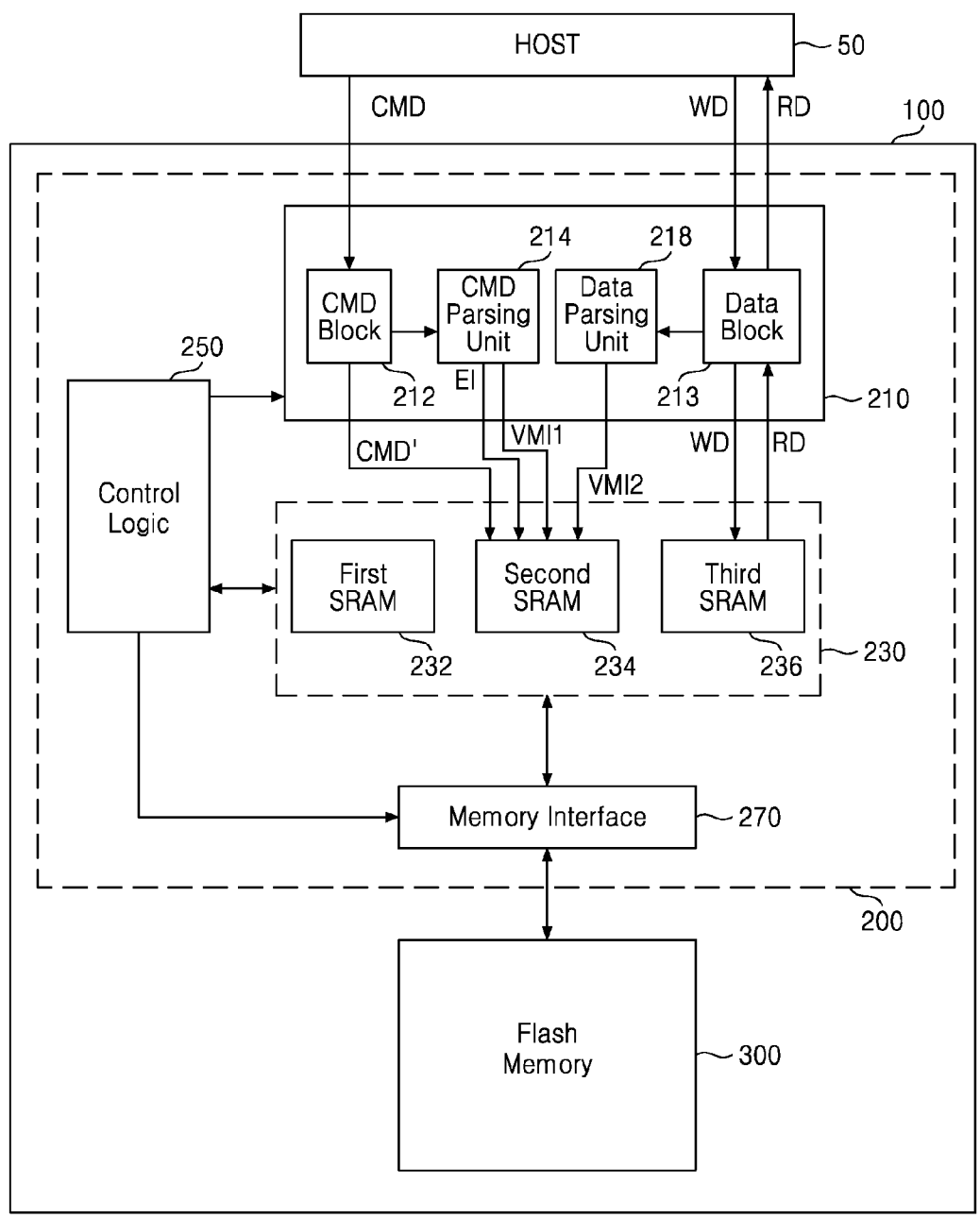
FIG. 2 is a block diagram specifically illustrating an embodiment of an eMMC device.
Figure 3:
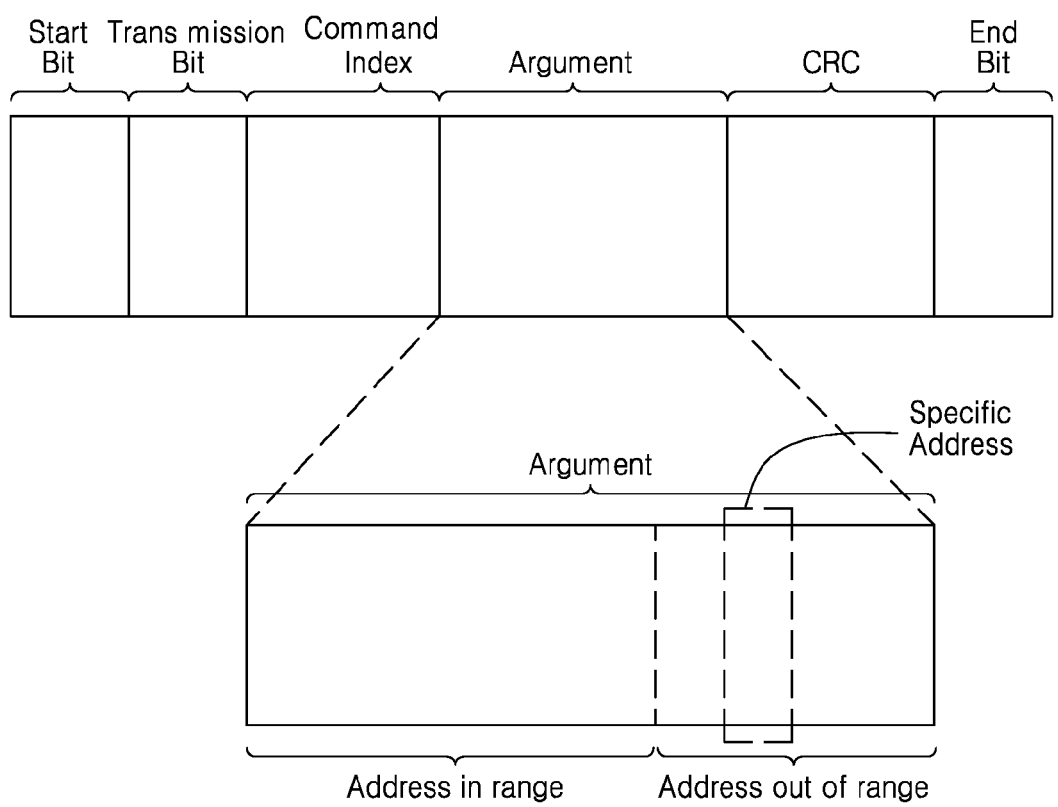
FIG. 3 is a diagram illustrating an example embodiment of the structure of a command input to an eMMC device.

FIG. 2 is a block diagram specifically illustrating an embodiment of eMMC device 100. FIG. 3 is a diagram illustrating an example embodiment of the structure of a command input to eMMC device 100. FIG. 4 is a diagram illustrating an example of a portion of write data input to eMMC device 100.

Referring to FIGS. 2 to 4, some embodiments of eMMC device 100 may include a memory controller 200 and a flash memory 300.

Memory controller 200 may control overall operations of eMMC device 100, and particularly, controls exchange of write data WD and read data RD between host 50 and flash memory 300. Memory controller 200 may include a host interface 210, a volatile memory 230, a control logic 250, and a memory interface 270.

Flash memory 300 may be embodied as a NAND flash memory, and may include a memory cell array (not shown) in which a plurality of memory cells capable of storing data are arranged in a matrix, a peripheral circuit (not shown) for accessing the memory cell array, and a page buffer (not shown). When flash memory 300 is embodied as a NAND flash memory, memory interface 270 may be embodied as a NAND flash interface.

Host interface 210 may receive a command CMD and a clock signal (not shown) from host 50 and control input/output of the write data WD and the read data RD, under control of control logic 250. Host interface 210 may include a command block 212, a command parsing unit 214, a data block 213, and a data parsing unit 218.

Command block 212 may parse the command CMD received from host 50 and transmit a result of parsing the command CMD to volatile memory 230 according to the clock signal. Also, command block 212 may buffer the command CMD and transmit the buffered command CMD to command parsing unit 214.

Command parsing unit 214 may receive the command CMD from command block 212, and extract a command argument from the command CMD.

Referring to FIG. 3, the structure of a command CMD input to eMMC device 100 according to one embodiment may include a start bit, a transmission bit, a command index, a command argument, a cyclical redundancy check (CRC) bit, and an end bit.

The start bit is a bit indicating start of the command CMD and may be fixedly set as, for example, '0'. The transmission bit is a bit indicating a device or subject which generated the command CMD. For example, when the transmission bit is '1', it means that the command CMD is generated by host 50. The command index includes a plurality of bits indicating the type of the command CMD and may indicate that the command CMD is a specific command among a plurality of commands to which eMMC device 100 may respond. For example, the command index may indicate that the command CMD is a write command when the command index is 'CMD 1', and may indicate that the command CMD is a read command when the command index is 'CMD 2'. Thus, eMMC device 100 may recognize the type of the command CMD, based on the command index, and may perform an operation corresponding to the command index.

The command argument may include information needed to perform an operation according to the command CMD. For example, when the command CMD is the read command or the write command, the command argument may include starting address information regarding a memory cell array (not shown) of flash memory 300 from which data is to be from or to which data is to be written, and data size information regarding the read data RD or the write data WD. The command argument may be divided into an address in range corresponding to the size of the memory cell array, i.e., a range including the starting address information and the data size information, and the other address out of range. In other words, the address in range of the command argument is valid data and the address out of range of the command argument is invalid data.

The CRC bit is used to detect an error that may occur during transmission of the command CMD, and may be, for example, 7-bits long. The end bit is a bit indicating end of the command CMD, and may be fixedly set as, for example, '1'.

Command parsing unit 214 may generate vendor mode entering information indicating whether the vendor mode is to be entered by parsing the extracted command argument. Command parsing unit 214 may determine whether command arguments received sequentially in units of bits are valid values by parsing the command arguments. Each of the command arguments comprises a plurality of bits (e.g. 32 bits). For example, when the command CMD is a read command or a write command and a part of command argument is within the address in range, the part of command argument may be determined as a valid value. In contrast, when another part of command argument is within the address out of range other than the address in range, another part of command argument may be determined as an invalid value.

When the command argument is determined as an invalid value, command parsing unit 214 may determine whether a part of the command argument corresponding to a specific address within the address out of range other than the address in range is equal to a value indicating that the vendor mode should be entered. The specific address is a specific part of the command argument (e.g. 4 bits following specific number of bits received after the start bit). If it is determined that the part of the command argument is not equal to the value indicating that the vendor mode should be entered, then command parsing unit 214 may transmit error information (EI) to volatile memory 230. In other words, when host 50 accesses a point outside the range of the memory cell array of flash memory 300, command parsing unit 214 may transmit the error information (EI) to volatile memory 230.

Command parsing unit 214 may generate vendor mode entering information based on the result of determining whether the command argument is equal to the value indicating that the vendor mode should be entered, and transmit the vendor mode entering information to volatile memory 230. The specific address may be a default address or may be changed according to a request from host 50 or by control logic 250, but the inventive concept is not limited thereto.

When eMMC device 100 enters the vendor mode, command parsing unit 214 may extract vendor mode attribute information from the command CMD under control of control logic 250. The vendor mode attribute information may include a plurality of pieces of information needed to perform a vendor mode operation. According to an embodiment of the inventive concept, the vendor mode attribute information may include type information, e.g., a command index, regarding a target vendor mode operation. The type information is related to a type of the target vendor mode operation (e.g. dump data mode, patch update mode).

The vendor mode attribute information may further include a plurality of pieces of information needed to perform a specific vendor mode operation.

For example, when the vendor mode is a dump data mode, the vendor mode attribute information may include information regarding a target to be dumped (e.g., volatile memory 230, a register (not shown), flash memory 300, etc.), starting address information, and data size information.

For example, when the vendor mode is a patch update mode, the vendor mode attribute information may include information regarding a target to be patch updated (e.g., volatile memory 230, the register, flash memory 300, etc.), starting address information, and data size information.

The vendor mode entering information generated by command parsing unit 214 and the vendor mode attribute information may be transmitted as first vendor mode information VMI1 to volatile memory 230.

Command parsing unit 214 may be embodied as hardware or firmware, but the inventive concept is not limited thereto.

Data block 213 may receive the write data WD from host 50 and transmit the write data WD to volatile memory 230 and data parsing unit 218 according to the clock signal. Data block 213 may receive the read data RD from volatile memory 230 and transmit the read data RD to host 50 according to the clock signal.

Data parsing unit 218 may generate vendor mode entering information indicating whether the vendor mode is to be entered by parsing the pattern of the received write data WD.

FIG. 4 illustrates an example of a portion of the write data WD input to data parsing unit 218. For example, it is assumed that the memory cell array of flash memory 300 is capable of storing 16 bytes for each row. Data parsing unit 218 may sequentially receive write data, each piece of which corresponds to one row address, in units of 16 bytes. When 24-byte write data WD that is initially received has a value of F for all 24 bytes, data parsing unit 218 may determine that the vendor mode is to be entered. Data parsing unit 218 may generate vendor mode entering information indicating whether the vendor mode is to be entered, based on a determination result thereof, and transmit this information to volatile memory 230.

A method employed for data parsing unit 218 to parse the write data WD and determine whether the vendor mode is to be entered may be based on write data WD of an arbitrary size corresponding to an arbitrary row address, but the inventive concept is not limited thereto.

When eMMC device 100 enters the vendor mode, data parsing unit 218 may extract the vendor mode attribute information from the write data WD, under control of control logic 250.

The vendor mode entering information generated by data parsing unit 218 and the vendor mode attribute information may be transmitted as second vendor mode information VMI2 to volatile memory 230.

Data parsing unit 218 may be embodied as hardware or firmware, but the inventive concept is not limited thereto. Data parsing unit 218 may be embodied as hardware to reduce a system load and maximize a processing speed.

According to another embodiment, eMMC device 100 may include only one of command parsing unit 214 and data parsing unit 218. In this case, control logic 250 may control the vendor mode of eMMC device 100 based on the first vendor mode information VMI1 or the second vendor mode information VMI2.

Volatile memory 230 may be embodied as, for example, a static access memory (SRAM) or a dynamic RAM (DRAM), but the inventive concept is not limited thereto.

In FIG. 2, it is assumed for convenience of explanation that volatile memory 230 is embodied as an SRAM. Volatile memory 230 may include a first SRAM 232, a second SRAM 234, and a third SRAM 236. First SRAM 232 to third SRAM 236 may be regions of one SRAM divided according to operations, respectively, or may be embodied as separate SRAMs.

First SRAM 232 may store program codes, e.g., firmware or software, which are needed to operate eMMC device 100. The program codes may be transmitted from flash memory 300 under control of control logic 250. Control logic 250 may control an operation of eMMC device 100 based on the program codes.

Second SRAM 234 may store code data to be used by the program codes stored in first SRAM 232. Second SRAM 234 may also store a parsed command CMD' received from host interface 210, the error information EI, the first vendor mode information VMI1, and the second vendor mode information VMI2.

Third SRAM 236 may temporarily store the read data RD and the write data WD exchanged between host interface 210 and memory interface 270.

In a write mode, host interface 210 may temporarily store the write data WD in third SRAM 236 by using the clock signal, under control of control logic 250. In this case, memory interface 270 may read the write data WD from third SRAM 236 and write it to flash memory 300, under control of control logic 250.

In a read mode, memory interface 270 may temporarily store the read data RD in third SRAM 236 by using the clock signal, under control of control logic 250. In this case, host interface 210 may read the read data RD from third SRAM 236 and transmit the read data RD to host 50, under control of control logic 250.

Control logic 250 may control overall operations of host interface 210, volatile memory 230, and memory interface 270. Control logic 250 may access a parsed access command CMD' stored in second SRAM 234, and operate eMMC device 100 in a mode corresponding to the parsed command CMD'.

For example, when it is determined based on the parsed access command CMD' stored in second SRAM 234 that a command index indicates a read command and a command argument instructs to read 16-byte data corresponding to a first row address of the memory cell array of flash memory 300, control logic 250 may control memory controller 200 to operate eMMC device 100 in the read mode so as to read the 16-byte data corresponding to the first row address from flash memory 300 and transmit the 16-byte data to host 50.

Control logic 250 may cause eMMC device 100 to enter a target vendor mode when a result of referring to the first vendor mode information VMI1 and the second vendor mode information VMI2 by accessing second SRAM 234 reveals that both the vendor mode entering information and the vendor mode attribute information are detected by the control logic 250.

For example, when the vendor mode entering information and vendor mode attribute information regarding a patch update mode are detected based on the first vendor mode information VMI1 and the second vendor mode information VMI2, respectively, control logic 250 may operate eMMC device 100 in the patch update mode.

For example, when both the vendor mode entering information and vendor mode attribute information for a dump data mode are detected based on the second vendor mode information VMI2, control logic 250 may operate eMMC device 100 in the dump data mode.

According to another embodiment of the inventive concept, control logic 250 may extract the vendor mode attribute information by accessing third SRAM 236 after the vendor mode entering information is detected.

Memory interface 270 may control transmission of program codes, code data that the program codes use, and data between flash memory 300 and volatile memory 230, under control of control logic 250.

Figure 5:
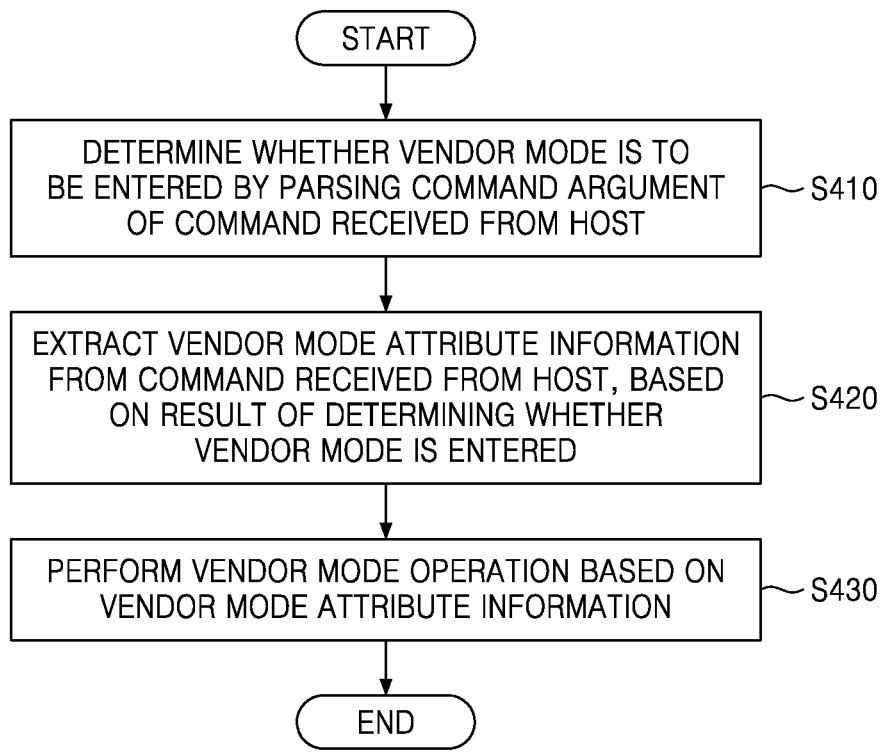
FIG. 5 is a flowchart illustrating an embodiment of a method of performing a vendor mode operation based on a command input to an eMMC device.

FIG. 5 is a flowchart illustrating an embodiment of a method of performing a vendor mode operation based on a command input to an eMMC device.

Referring to FIGS. 2 and 5, in an operation S410, command parsing unit 214 may extract a command argument from a command CMD received from host 50, and determine whether the vendor mode is to be entered by parsing the extracted command argument, and generate vendor mode entering information based on a result of determining whether the vendor mode is to be entered.) The generated vendor mode entering information may be stored in volatile memory 230.

When the vendor mode is entered based on the vendor mode entering information, in an operation S420 command parsing unit 214 or data parsing unit 218 may extract vendor mode attribute information from the command CMD or write data WD received from host 50. The extracted vendor mode attribute information may be stored in volatile memory 230.

Then, in an operation S430, control logic 250 causes eMMC device 100 to enter a vendor mode, when a result of referring to first vendor mode information VMI1 and second vendor mode information VMI2 by accessing volatile memory 230 reveals that both vendor mode entering information and vendor mode attribute information are detected.

Figure 6:
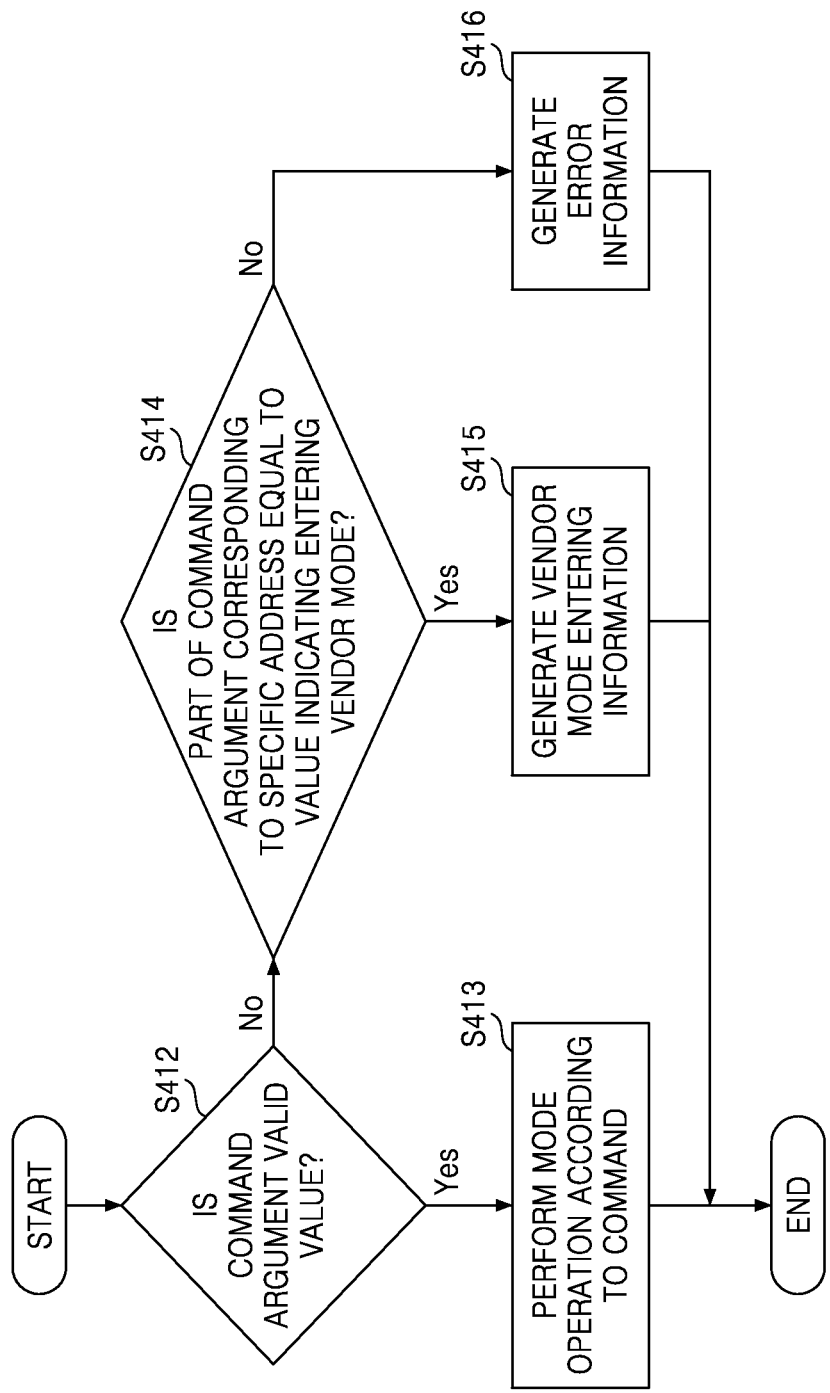
FIG. 6 is a flowchart specifically illustrating an example operation of determining whether a vendor mode is to be entered, which is included in the method of FIG. 5.
Figure 7:
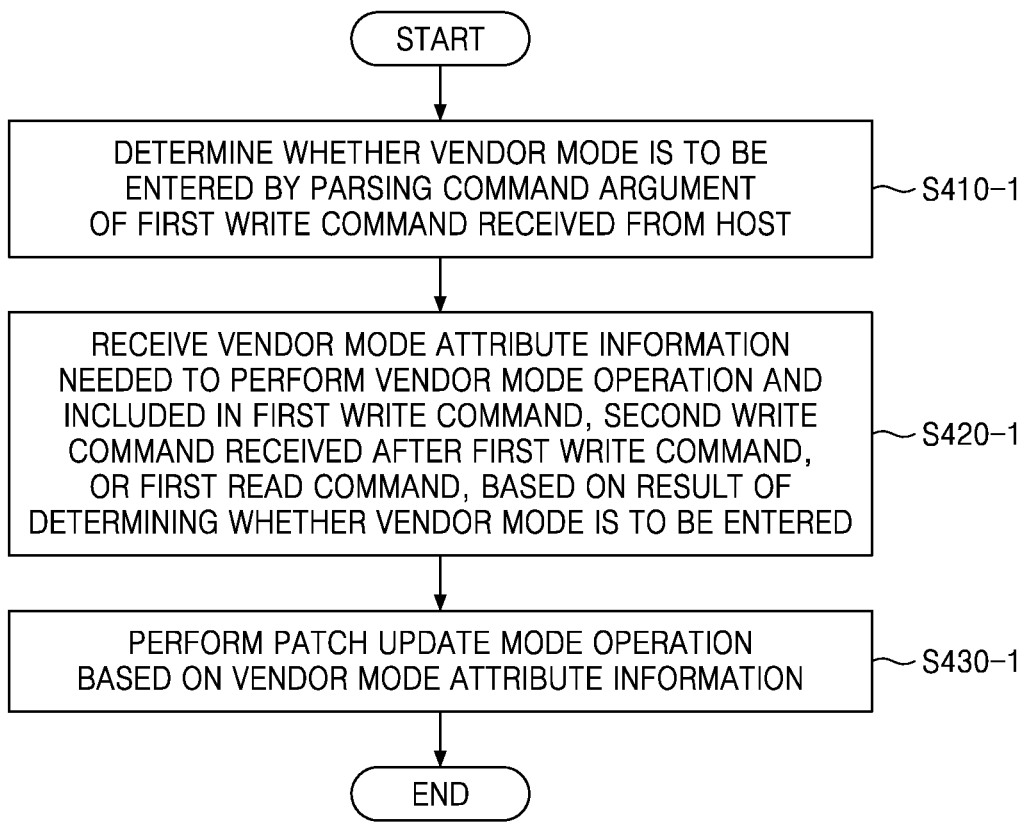
FIGS. 7 to 14 are flowcharts illustrating examples of applying the method of performing a vendor mode operation based on a command input to an eMMC device illustrated in FIG. 5.
Figure 8:
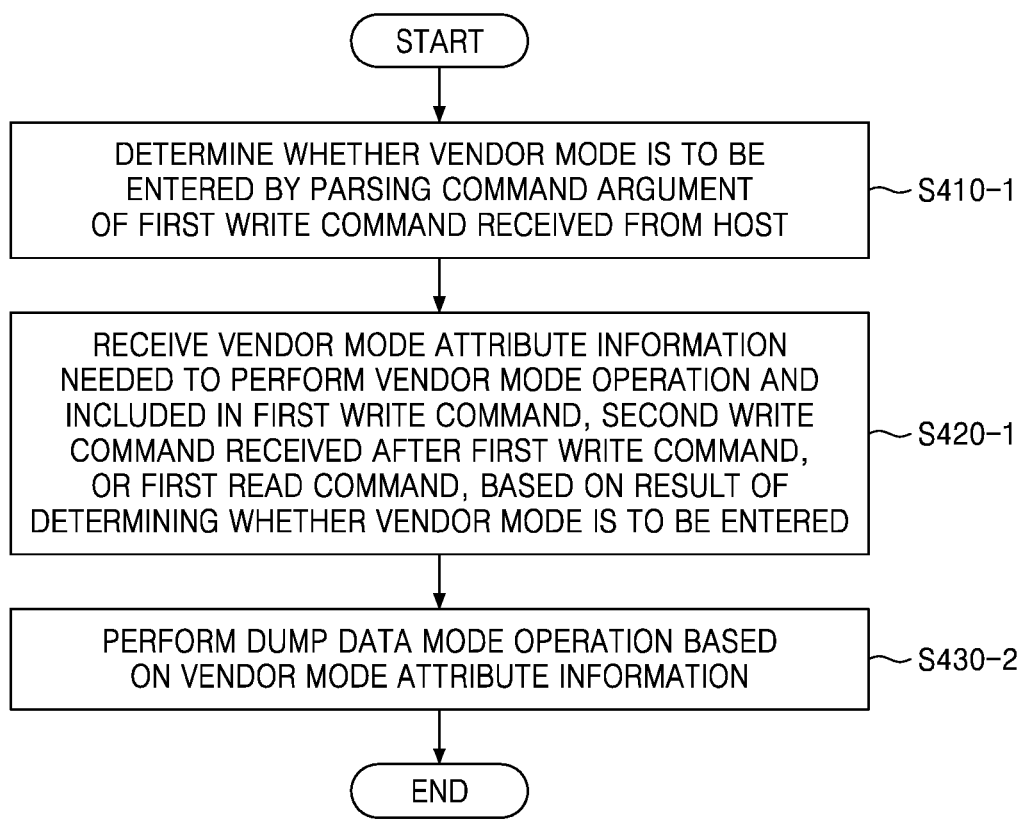
Figure 9:
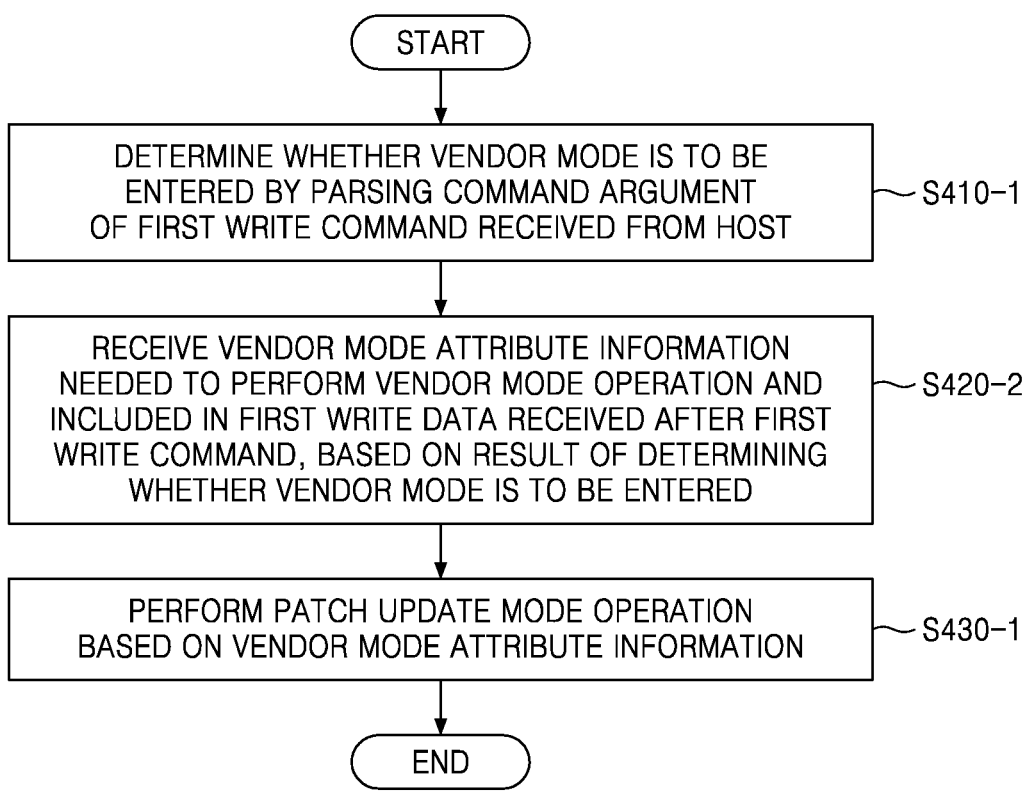
Figure 10:
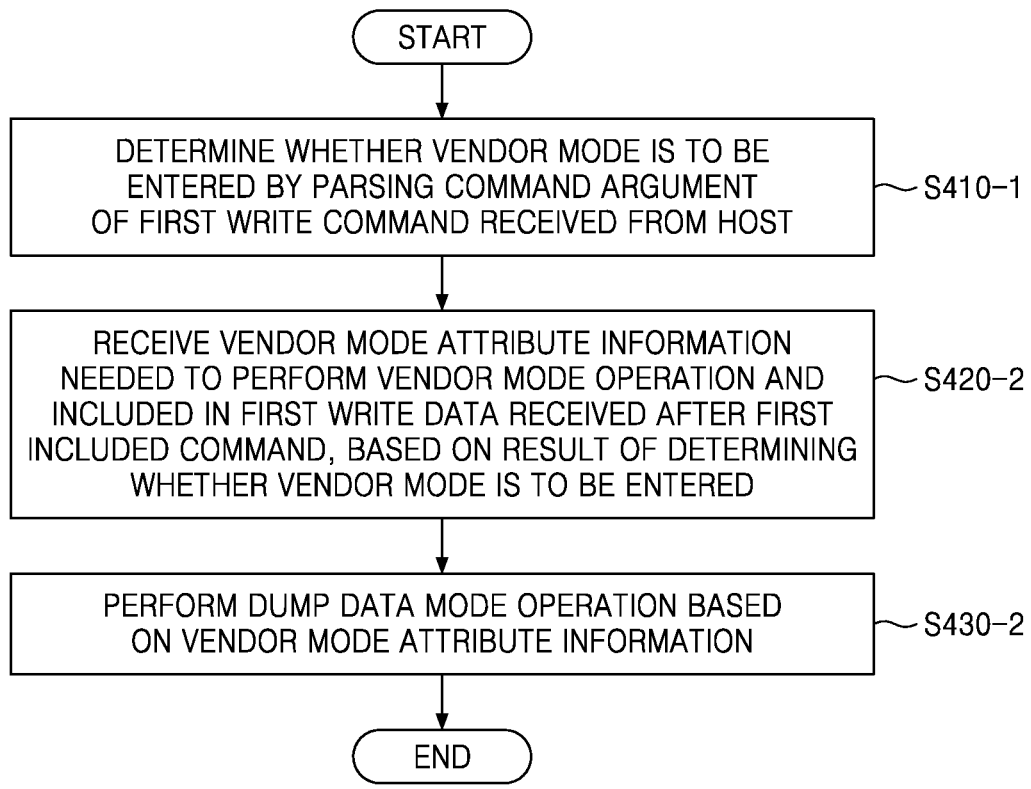
Figure 11:
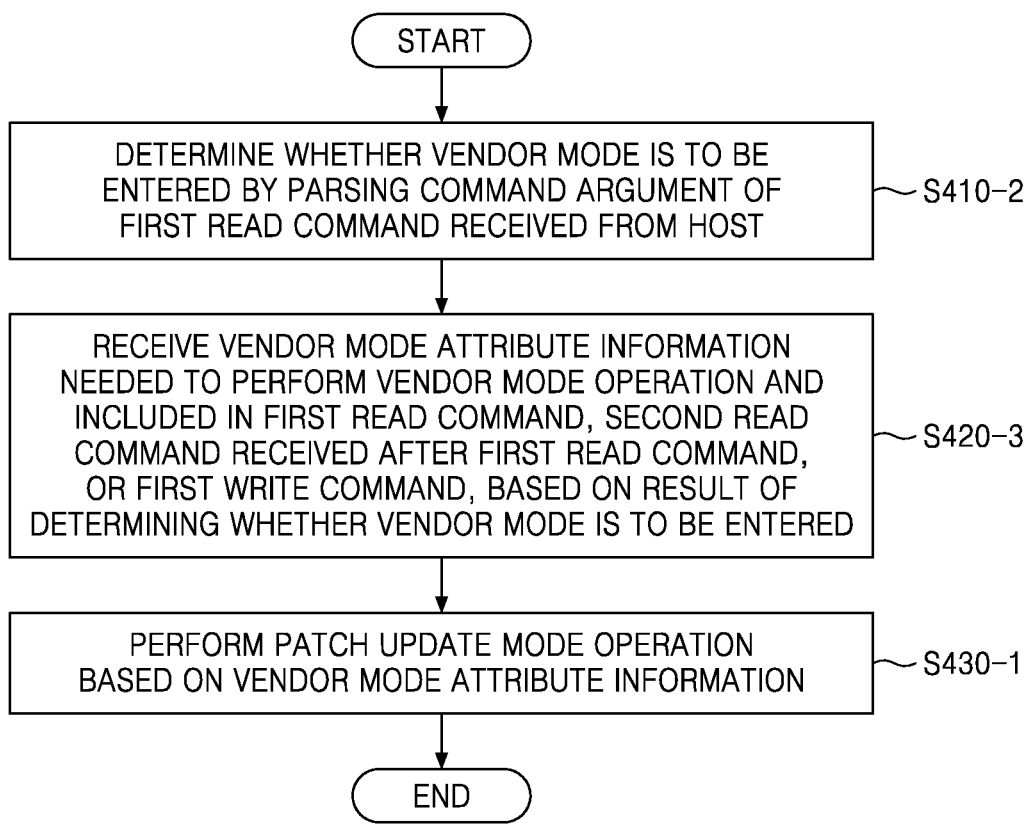
Figure 12:
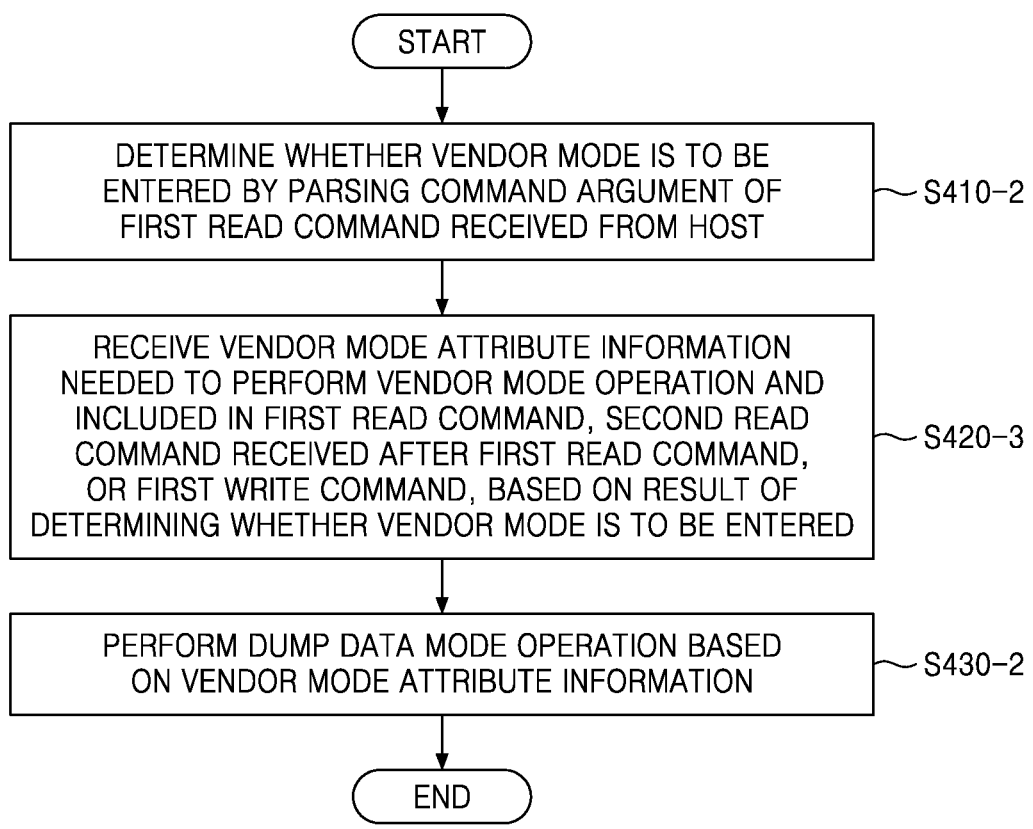
Figure 13:
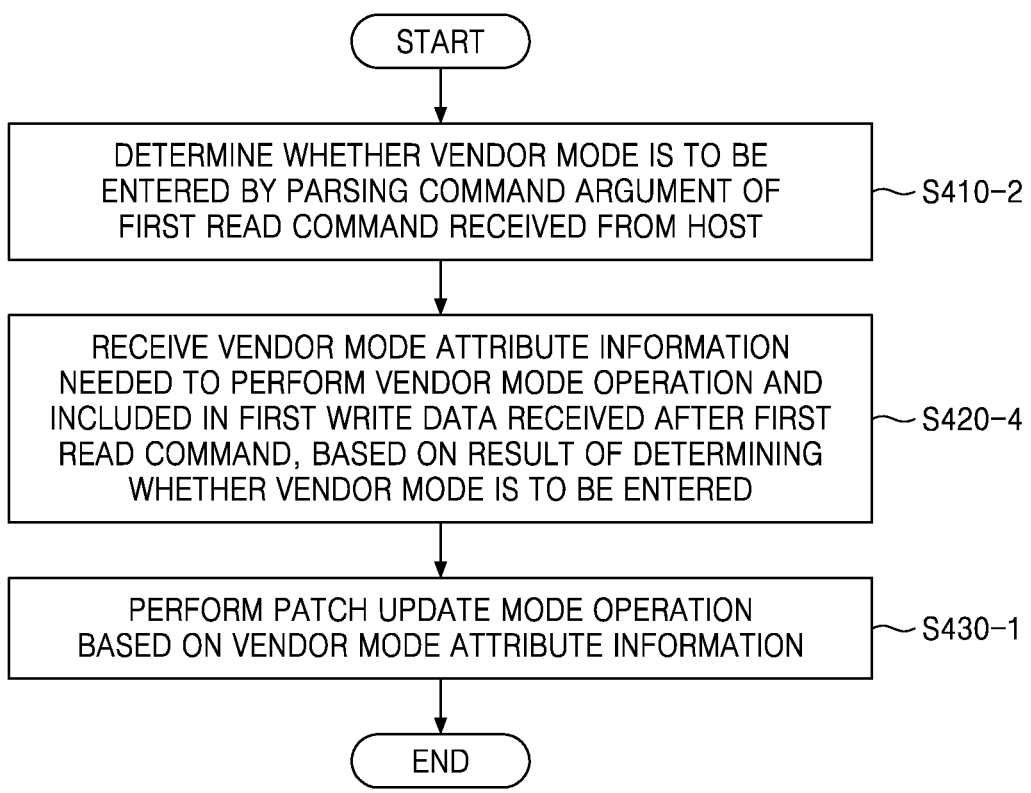
Figure 14:
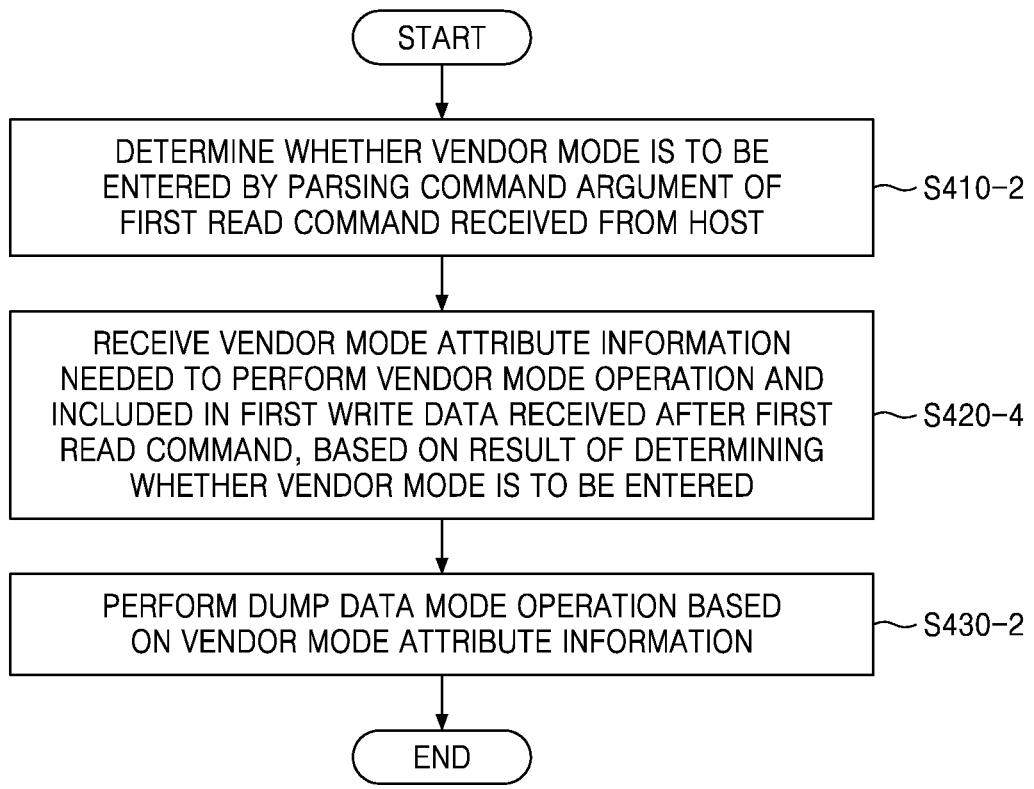

FIG. 6 is a flowchart specifically illustrating the operation S410 of determining whether the vendor mode is to be entered, which is included in the method of FIG. 5.

Referring to FIGS. 2, 5, and 6, the operation S410 of determining of whether the vendor mode is to be entered may include an operation S412 of determining whether the command argument is a valid value by checking whether the command argument is a value beyond a range of a valid address corresponding to the size of the memory cell array of flash memory 300, i.e., a value in an address out of range, and, when it is determined that the command argument is an invalid value, in an operation S414 determining whether a part of the command argument corresponding to a specific address is equal to a value indicating entering the vendor mode.

According to another embodiment, the operation S410 of determining of whether the vendor mode is to be entered may be performed using not only a value of the command argument, which is in the address out of range, but also an arbitrary value that is not used to perform a command CMD.

When the command argument is a valid value, then in an operation S413 control logic 250 may operate eMMC device 100 in a mode according to the command CMD including the command argument, for example, a read mode, a write mode, an erase mode, or the like.

When the command argument is an invalid value and the command argument is equal to the value indicating entering the vendor mode, then in an operation S415 command parsing unit 214 may generate vendor mode entering information according to the value indicating entering the vendor mode and transmit the vendor mode entering information to volatile memory 230.

When the command argument is an invalid value and the command argument is not equal to the value indicating entering the vendor mode, then in an operation S416 command parsing unit 214 may transmit error information EI to volatile memory 230.

FIGS. 7 to 14 are flowcharts illustrating examples of applying the method of performing a vendor mode operation based on a command input to an eMMC device illustrated in FIG. 5.

Referring to FIGS. 2, 5, and 7 to 14, operations S410-1, S410-2, S420-1, S420-2, S420-3, S420-4, S430-1, and S430-2 included in the examples of applying the method of performing a vendor mode operation based on a command illustrated in FIGS. 7 to 14 correspond to operations S410 to S430 illustrated in FIG. 5, respectively.

The determining of whether the vendor mode is to be entered (operation S410) may be applied to determining whether a vendor mode is to be entered by parsing a command argument of a first write command received from host 50 (operation S410-1), or determining whether a vendor mode is to be entered by parsing a command argument of a first read command received from host 50 (operation S410-2).

The receiving of the vendor mode attribute information (operation S420) may be applied to either receiving vendor mode attribute information needed to perform the vendor mode operation and included in the first write command, a second write command received after the first write command, or a first read command, based on the determining of whether the vendor mode is to be entered (operation S420-1), or receiving vendor mode attribute information needed to perform the vendor mode operation and included in first write data received after the first write command, based on the determining of whether the vendor mode is to be entered (operation S420-2), when the determining of whether the vendor mode is to be entered by parsing the command argument of the first write command (operation S410-1) is performed.

Also, the receiving of the vendor mode attribute information (operation S420) may be applied to either receiving vendor mode attribute information needed to perform the vendor mode operation and included in the first read command, a second read command received after the first read command, or a first write command, according to a result of determining whether the vendor mode is to be entered (operation S420-3), or receiving vendor mode attribute information needed to perform the vendor mode operation and included in first write data received after the first read command, according to a result of determining whether the vendor mode is to be entered (operation S420-4), when the determining of whether the vendor mode is to be entered by parsing the command argument of the first read command (operation S410-2) is performed.

The performing of the vendor mode operation (operation S430) may be applied to performing a patch update mode operation determined based on the vendor mode attribute information (operation S430-1), or performing a dump data mode operation determined based on the vendor mode attribute information (operation S430-2), after the receiving of the vendor mode attribute information included in a command or write data (operations S420-1, S420-2, S420-3, and S420-4) is performed. The examples of applying the method of performing a vendor mode operation based on a command illustrated in FIG. 5, which are illustrated in FIGS. 7 to 14, are combinations of operations S410-1, S410-2, S420-1, S420-2, S420-3, S420-4, S430-1, and S430-2 of the examples corresponding to operations S410 to S430 illustrated in FIG. 5.

The examples of applying the method of performing a vendor mode operation based on a command of FIG. 5, which are illustrated in FIGS. 7 to 14, are just illustrative, and the inventive concept is not limited thereto.

According to an embodiment of the inventive concept, when vendor mode attribute information is not needed according to the type of a vendor mode, operations S420-1, S420-2, S420-3, and S420-4 of receiving the vendor mode attribute information may be omitted. For example, when the type of a vendor mode is determined by the type of a command including vendor mode entering information, operations S420-1, S420-2, S420-3, and S420-4 of receiving the vendor mode attribute information may be omitted.

Figure 15:
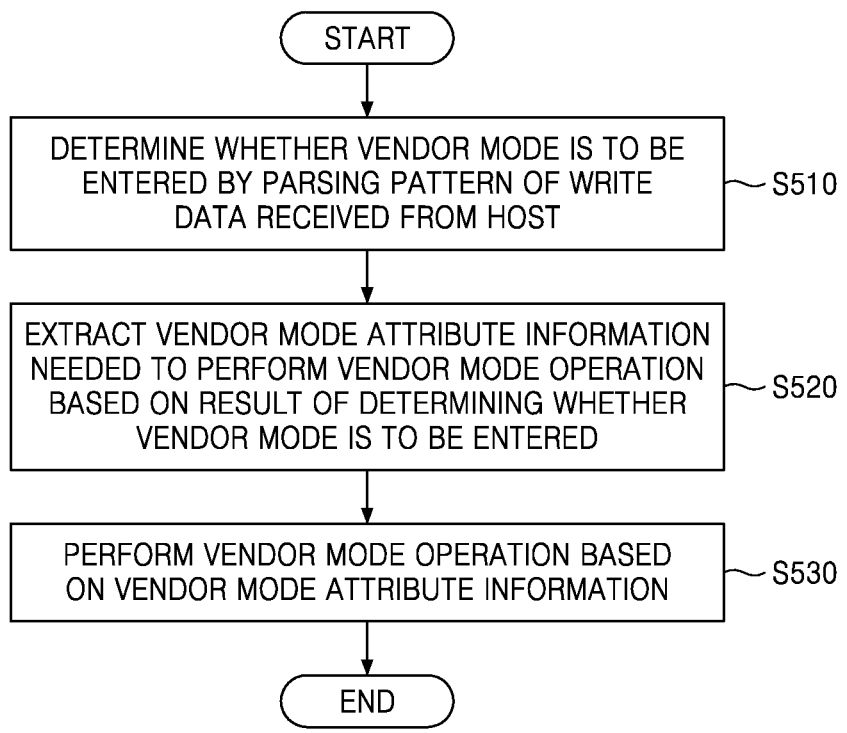
FIG. 15 is a flowchart illustrating another embodiment of a method of performing a vendor mode operation based on write data input to an eMMC device.
Figure 16:
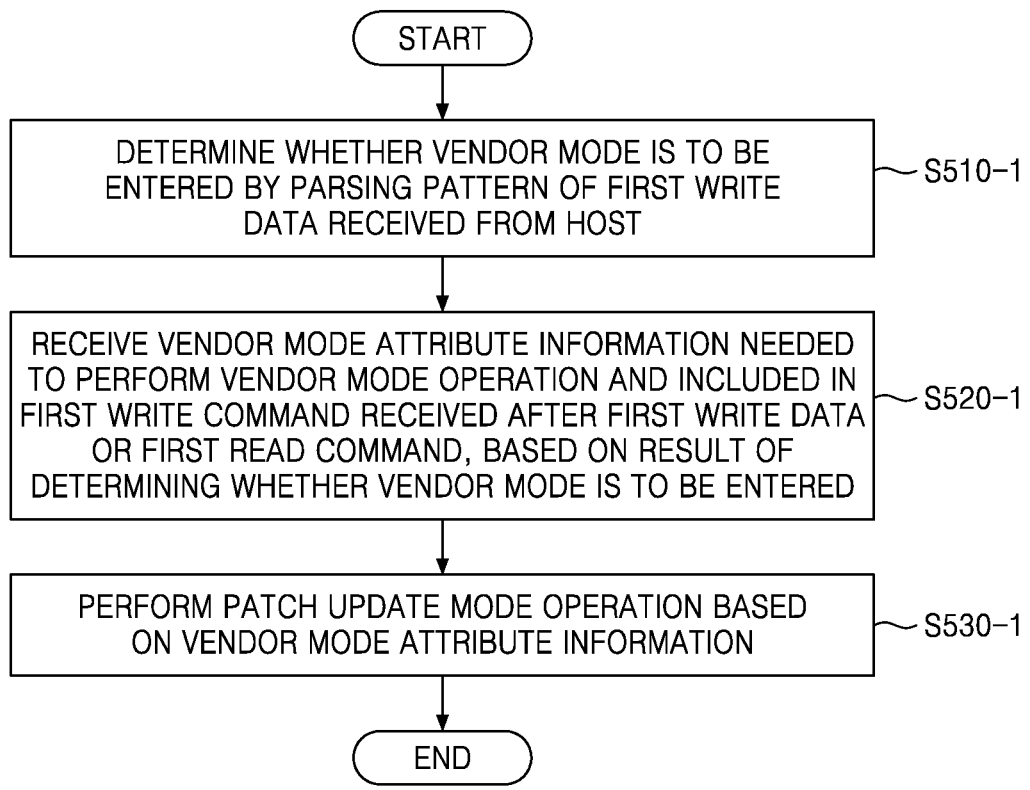
FIGS. 16 to 19 are flowcharts illustrating examples of applying the method of performing a vendor mode operation based on write data input to an eMMC device illustrated in FIG. 15.
Figure 17:
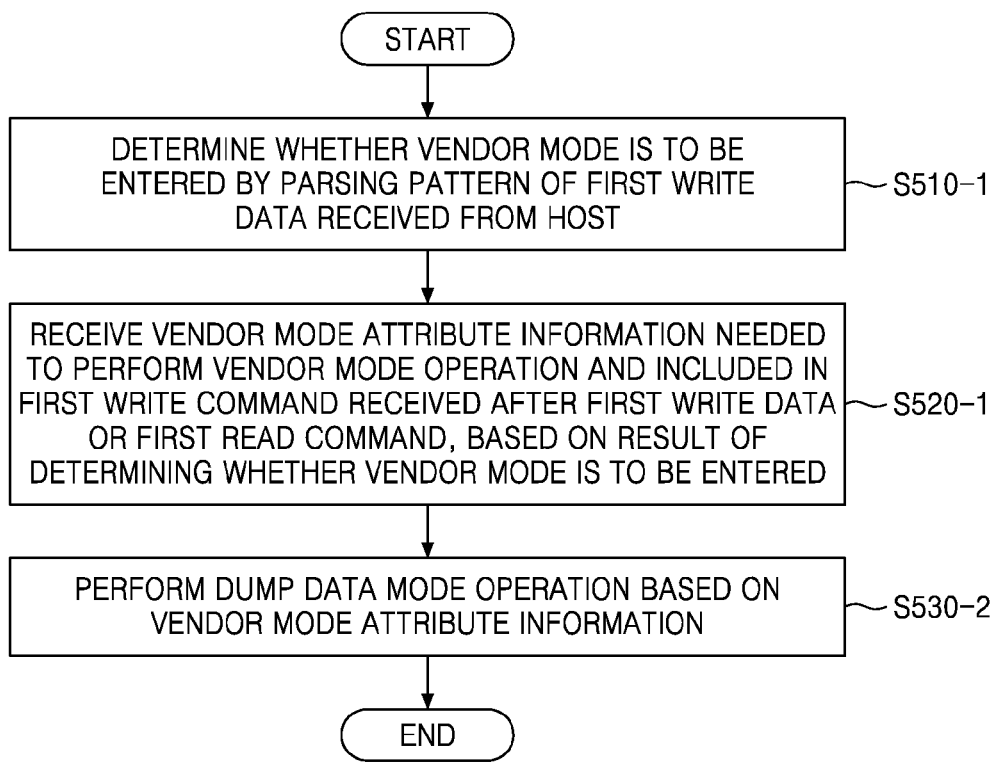
Figure 18:
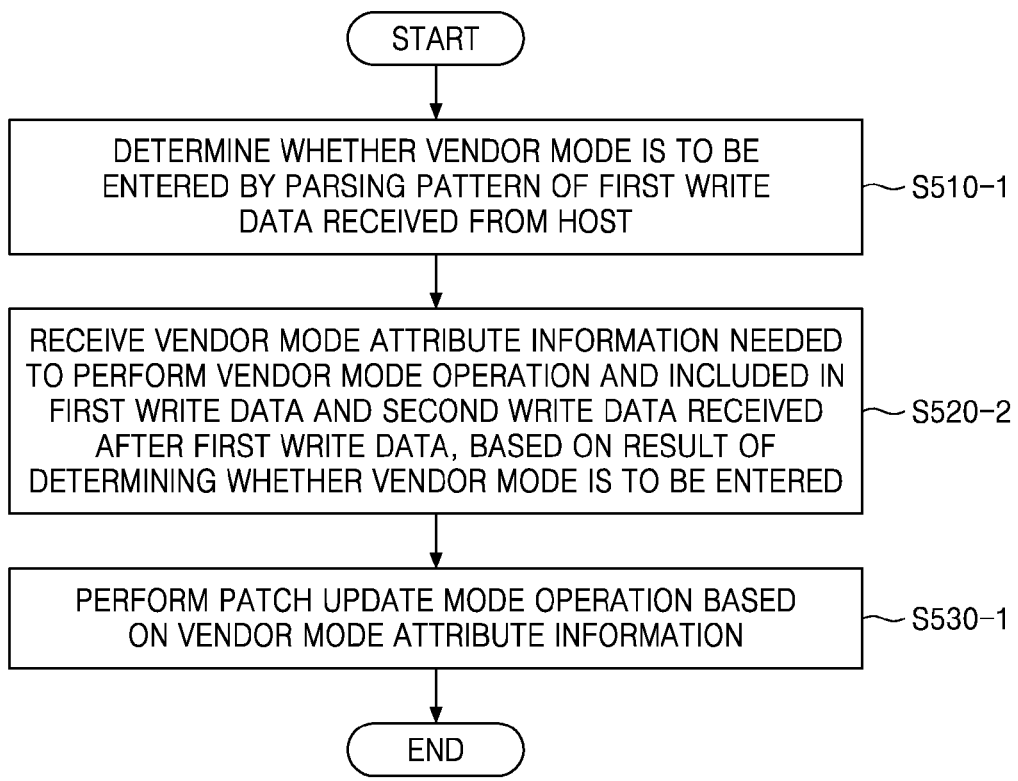
Figure 19:
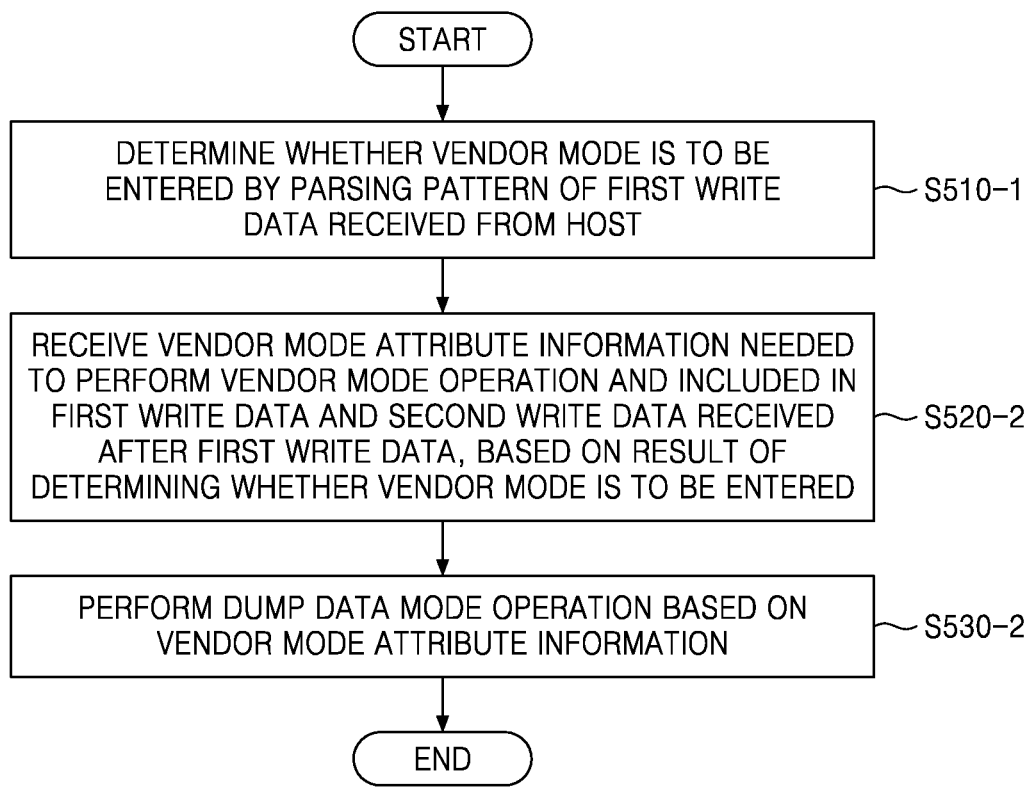

FIG. 15 is a flowchart illustrating another embodiment of a method of performing a vendor mode operation based on write data input to an eMMC device.

Referring to FIGS. 2 and 15, data parsing unit 218 may receive write data WD transmitted from host 50, via data block 213. In an operation S510, data parsing unit 218 may determine whether a vendor mode is to be entered by parsing the pattern of the write data WD, and generate vendor mode entering information based on a result of determine whether the vendor mode is to be entered. The vendor mode entering information may be stored in volatile memory 230.

When the vendor mode is entered based on the vendor mode entering information, in an operation S520 command parsing unit 214 or data parsing unit 218 may extract vendor mode attribute information from a command or the write data WD received from host 50. The extracted vendor mode attribute information may be stored in volatile memory 230.

Then, in an operation S530, control logic 250 may cause eMMC device 100 to enter the vendor mode when a result of referring to first vendor mode information VMI1 and second vendor mode information VMI2 by accessing volatile memory 230 reveals that both the vendor mode entering information and the vendor mode attribute information are detected.

FIGS. 16 to 19 are flowcharts illustrating examples of applying the method of performing a vendor mode operation based on write data input to an eMMC device illustrated in FIG. 15. Referring to FIGS. 2 and 15 to FIG. 19, operations S510-1, S520-1, S520-2, S530-1, and S530-2 of the examples of applying the method of performing a vendor mode operation based on write data, which are illustrated in FIGS. 16 to 19, correspond to operations S510 to S530 of FIG. 15.

The determining of whether the vendor mode is to be entered (operation S510) may be applied to determining whether the vendor mode is to be entered by parsing the pattern of first write data received from host 50 (operation S510-1).

The receiving of the vendor mode attribute information (operation S520) may be applied to either receiving vendor mode attribute information needed to perform the vendor mode operation and included in a first write command or a first read command received after the first write data, based on a result of determining whether the vendor mode is to be entered (operation S520-1) or receiving vendor mode attribute information needed to perform the vendor mode operation and included in the first write data and second write data received after the first write data, based on a result of determining whether the vendor mode is to be entered (operation S520-2), when the determining of whether the vendor mode is to be entered by parsing the pattern of the first write data (operation S510-1) is performed.

The performing of the vendor mode operation (operation S530) may be applied to performing a patch update mode operation determined based on the vendor mode attribute information (operation S530-1), or performing a dump data mode operation determined based on the vendor mode attribute information (operation S530-2), after the receiving of the vendor mode attribute information included in a command or write data (operation S520-1, S520-2) is performed.

The examples of applying the method of performing a vendor mode operation based on write data, which are illustrated in FIGS. 16 to 19, are combinations of operation S510-1, S520-1, S520-2, S530-1, and S530-2 corresponding to operations S510 to S530 of FIG. 15.

The examples of applying the method of performing a vendor mode operation based on write data of FIG. 15, which are illustrated in FIGS. 16 to 19, are just illustrative and the inventive concept is not limited thereto.

According to an embodiment, when vendor mode attribute information is not needed according to the type of a vendor mode, the receiving of the vendor mode attribute information (operations S520-1 and S520-2) may be omitted. For example, when the type of the vendor mode is determined by the type of data including vendor mode entering information, the receiving of the vendor mode attribute information (operations S520-1 and S520-2) may be omitted.

In an eMMC system as described above, a host may control a vendor mode of an eMMC by using a command or write data other than an additional vendor command.

Also, an eMMC may enter a vendor mode according to a command or write data transmitted from a host, thereby increasing the compatibility with the host.

While the inventive concept has been particularly shown and described with reference to exemplary embodiments thereof, it will be understood that various changes in form and details may be made therein without departing from the spirit and scope of the following claims.

What is claimed is:

1. A method of operating an embedded multimedia card (eMMC), the method comprising:
  determining whether a vendor mode is to be entered by parsing a command argument of a command received from a host;
  receiving vendor mode attribute information for the vendor mode, based on a result of determining whether the vendor mode is to be entered; and performing a vendor mode operation in the vendor mode based on the vendor mode attribute information, wherein the determining of whether the vendor mode is to be entered comprises determining whether the command argument is a valid value by checking whether the command argument is outside a range of valid addresses of a memory cell array of the eMMC;

determining whether a part of the command argument corresponding to a specific address is equal to a value indicating entering the vendor mode, responsive to determination that the command argument is an invalid value outside the range of the valid addresses;

generating vendor mode entering information, responsive to determination that the part of the command argument corresponding to the specific address is equal to the value indicating entering the vendor mode; and generating error information, responsive to determination that the part of the command argument corresponding to the specific address is not equal to the value indicating entering the vendor mode.

2. The method of claim 1, wherein the command is a read command or a write command.

3. The method of claim 1, wherein the command is a first write command, and wherein the vendor mode attribute information is included in one of the first write command, a second write command received after the first write command, and a first read command.

4. The method of claim 1, wherein the command is a first write command, and wherein the vendor mode attribute information is included in first write data received after the first write command.

5. The method of claim 1, wherein the command is a first read command, and wherein the vendor mode attribute information is included in one of the first read command, a second read command received after the first read command, and a first write command.

6. The method of claim 1, wherein the command is a first read command, and wherein the vendor mode attribute information is included in first write data received after the first read command.

7. The method of claim 1, wherein the vendor mode is a patch update mode, wherein the vendor mode attribute information comprises at least one of starting address information and data size information, and wherein the performing of the vendor mode operation comprises writing patch update data to a memory cell array corresponding to the starting address information and the data size information.

8. The method of claim 1, wherein the vendor mode is a dump data mode, wherein the vendor mode attribute information comprises at least one of starting address information and data size information, and wherein the performing of the vendor mode operation comprises reading dump data from a memory cell array corresponding to the starting address information and the data size information.

9. An apparatus, comprising:
an embedded multimedia card (eMMC), wherein the eMMC comprises:
a memory including a memory cell array in which a plurality of memory cells are arranged; and
a memory controller configured to control exchange of data between a host and the memory,
wherein the memory controller comprises:
a command parsing unit configured to generate vendor mode entering information indicating whether a vendor mode is to be entered by parsing one of: (1) a command argument of a command received from the host, and (2) a pattern of write data received from the host; and
a control logic for changing a mode of the memory controller based on the vendor mode entering information,
wherein the command parsing unit is configured to determine whether the command argument is a valid value by checking whether the command argument is outside a range of valid addresses of the memory cell array, determine whether a part of the command argument corresponding to a specific address is equal to a value indicating entering the vendor mode responsive to determination that the command argument is an invalid value outside the range of the valid addresses, generate vendor mode entering information responsive to determination that the part of the command argument corresponding to the specific address is equal to the value indicating entering the vendor mode, and generate error information responsive to determination that the part of the command argument corresponding to the specific address is not equal to the value indicating entering the vendor mode.

10. The apparatus of claim 9, wherein the memory controller further comprises a volatile memory configured to store the vendor mode entering information, and further to store vendor mode attribute information needed to perform the vendor mode.

11. The apparatus of claim 10, wherein the vendor mode attribute information is included in the command or data received from the host.

12. The apparatus of claim 9, wherein the command parsing unit is embodied as hardware.

13. The apparatus of claim 9, wherein the host is configured to exchange data with the eMMC and transmit the vendor mode entering information via at least one of the command and the write data.

* * * * *